Aug. 17, 1965 P. E. GOREHAM 3,201,019
APERTURE SENSING MECHANISMS
Filed Nov. 8, 1962 3 Sheets-Sheet 2

INVENTOR
Peter E. Goreham
BY Watson, Cole, Grindle & Watson
ATTORNEYS

Aug. 17, 1965          P. E. GOREHAM          3,201,019
                    APERTURE SENSING MECHANISMS
Filed Nov. 8, 1962                        3 Sheets-Sheet 3

INVENTOR
Peter E. Goreham
BY Watson, Cole, Grindle & Watson
ATTORNEYS

APERTURE SENSING MECHANISMS

Peter Ernest Goreham, Hillborough, Herne Bay, England, assignor to Moore Business Forms, Inc., Niagara Falls, N.Y., a corporation of Delaware
Filed Nov. 8, 1962, Ser. No. 236,233
Claims priority, application Great Britain, Nov. 9, 1961, 40,154/61
7 Claims. (Cl. 226—9)

This invention has reference to aperture sensing mechanism and has particular but non-exclusive reference to mechanism for sensing apertures in bands of endless tape, fed in synchronism with the continuous stationery which is being fed to a typewriter or like imprinting machine. Several such mechanisms have been proposed, but these have not been found altogether satisfactory because, for example, the sensing pins or fingers in engaging the apertures in the endless tape have caused tearing of the tape.

It is an object of the present invention to provide an improved form of aperture sensing mechanism.

It is another object of the present invention to provide an aperture sensing mechanism whereby the tearing of the apertures in the endless tape is eliminated or reduced.

According to the present invention, aperture sensing mechanism comprises feed means for feeding an apertured sensing tape or the like, a sensing pin which is urged towards the sensing tape under spring action to be capable of passing through a sensing aperture into the tape to halt the tape.

An aperture sensing mechanism in accordance with the invention, will now be described by way of example with reference to the accompanying drawings wherein.

Figure 1:
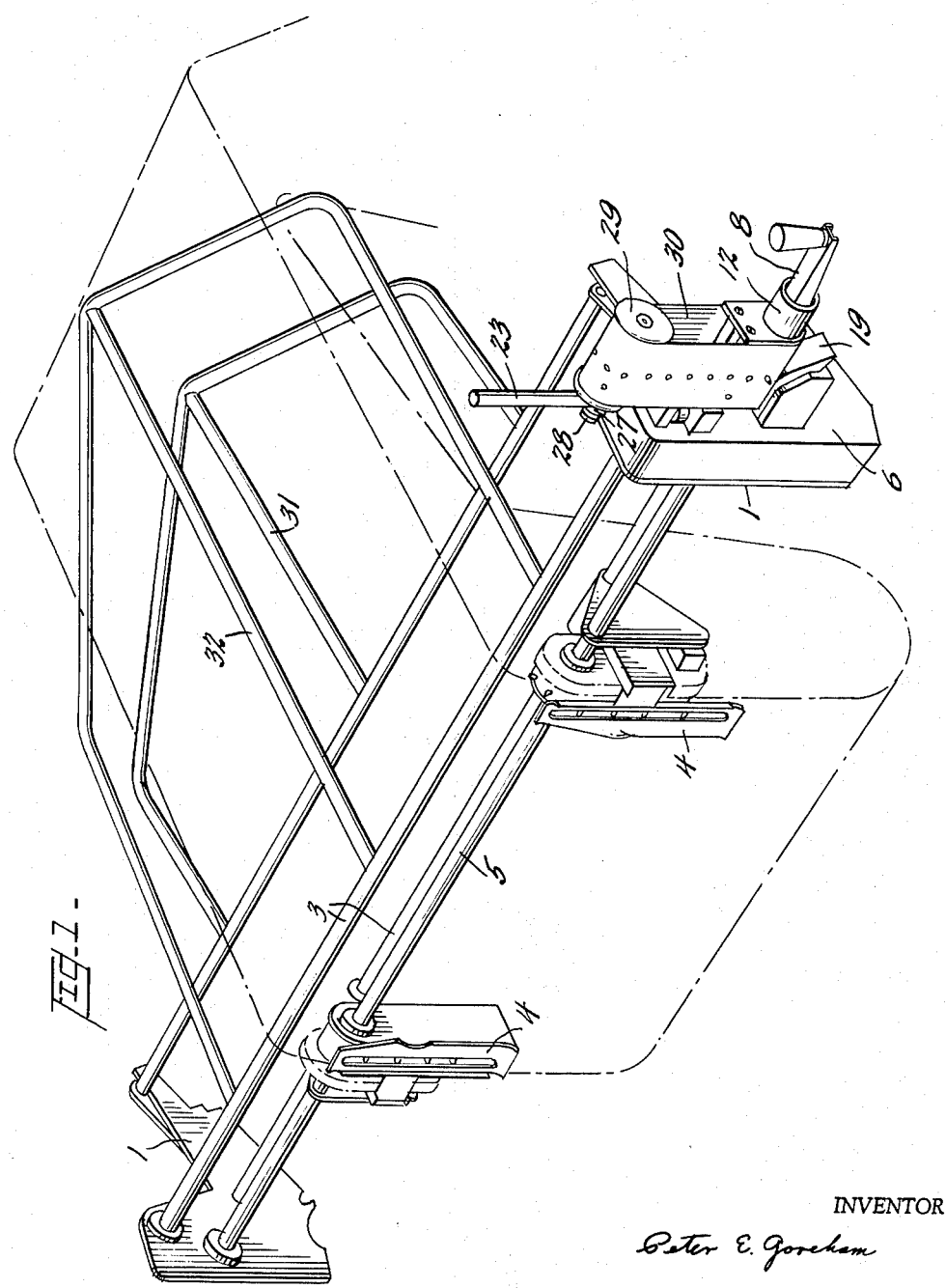
FIG. 1 is a perspective view of the mechanism.
Figure 2:
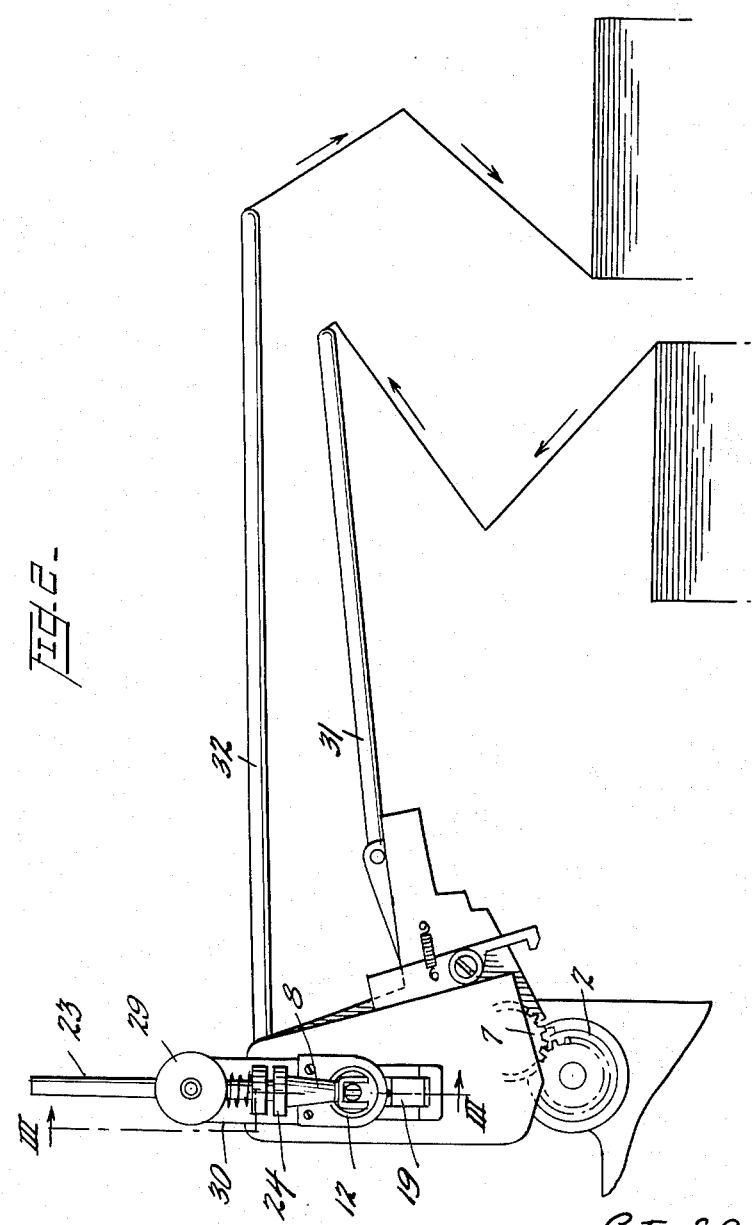
FIG. 2 is a side view of the mechanism.
Figure 3:
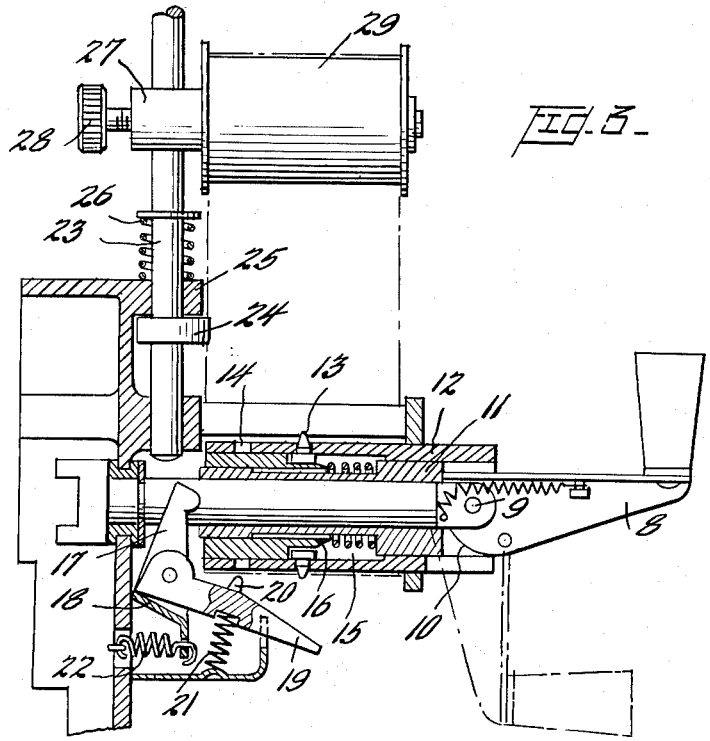
FIG. 3 is a view taken on the line III—III of FIG. 2.
Figure 4:
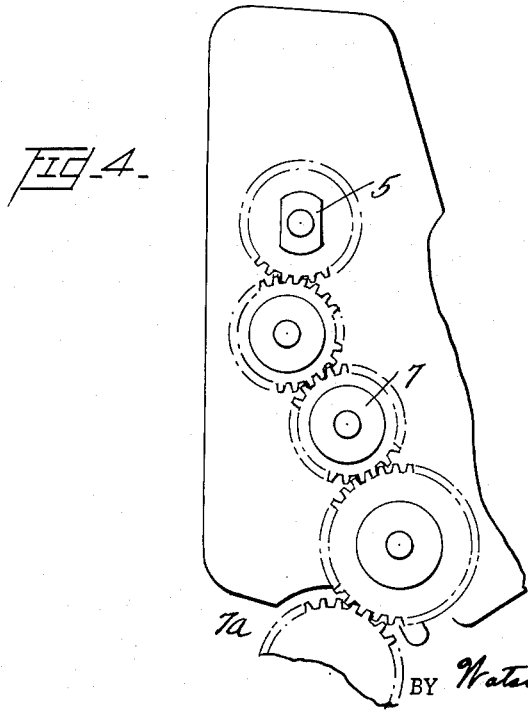
FIG. 4 is a similar diagrammatic view mainly in side elevation of the driving gearing housed in casing 6.

As shown in the drawings, the mechanism comprises a pair of brackets 1 for attachment to a typewriter or similar printing machine having a platen 2. Cross bars 3 are provided between the brackets 1 and serve as supports for a pair of pin feed tractors 4. A driving shaft 5 is also mounted between these brackets and which serves to drive the tractors 4.

A casing 6 is mounted on the right hand bracket and a train of gears 7 is mounted within this casing to connect the driving shaft 5 with a gear 7a connected to the shaft carrying the typewriter platen 2. The driving shaft 5 is extended and at its end carries an operating handle 8. This handle, which is mounted on a pivot 9, is spring urged towards a position in line with the driving shaft 5 but may be pivoted to a position perpendicular to the shaft 5. The handle 8 has its inner end 10 shaped to form a cam surface. This cam surface engages a sleeve 11 mounted within a wheel or drum 12, which carries feed pins 13 and which has a series of apertures 14 arranged peripherally around its outer surface. The pins are spaced apart by a distance corresponding to the spacing of the apertures in the feed tape (to be hereinafter described) and the apertures in the drum are spaced apart by a distance such that the distance between adjacent apertures corresponds to the distance of one line space of the typewriter. A spring 15 is mounted between the sleeve 11 and a ring member 16 and serves to urge the sleeve outwardly towards the handle 8. The inner end of the sleeve 11 engages a pivoted lever 17 which has a flange 18. A further lever 19 carries a sensing pin 20 and is urged by a compression spring 21 towards the drum so that the pin 20 will engage and move into one of the apertures 14 in the drum as the drum is rotated. A spring 22 acts to urge the lever 17 against the sleeve 11 so that the lever 17 pivots in accordance with the movement of the sleeve 11 which, in turn, follows the movement of the handle 8. The flange 18 on the lever 17 engages the rear end of the lever 19 so that when the sleeve 11 is retracted, the lever 17 is pivoted and the flange engages the rear end of the lever 19 so that the pin 20 is retracted out of the aperture 14. It will be apparent that the spring 22 is stronger than the spring 21 so that when the handle is pivoted to its operative position and when the pin 20 engages an aperture, and because the lever 19 is unable to move circumferentially of the drum, further rotation of the drum will be prevented. Normally, the springs 15 and 22 cause the sleeve to be moved outwardly to pivot the lever 17 and carry with it the lever 19 to cause the pin to be moved away from the holes 14 in the drum 12. However, when the manually operating lever 8 is pivoted against the action of the springs 15 and 22, levers 17 and 19 will move, so that the pin 20 will be urged into the holes 14 in the drum.

The casing 6 carries an upstanding post 23. This post has a flange 24, which engages a boss 25 on the casing. A spring 26 urges the flange and boss into engagement. A sleeve 27 is carried on the post 23 and is adjustably secured to the post by a knurled screw 28. This sleeve carries a roller 29 around which an endless tape 30 may be passed, which tape also passes around the drum 12. Different lengths of tape may be accommodated for passing around the drum and roller by adjusting the position of the sleeve 27 on the post 23. The mechanism also includes V-shaped infeed guides 31 and outfeed guides 32 for the continuous stationery. These guides may be of the kind described in the Specification of United States Patent No. 3,013,646, granted December 19, 1961 to A. A. Sargent.

When the mechanism is to be used for controlling the feed of a continuous stationery web, the web is located on the typewriter by passing it over the infeed guides 31, around the platen 2 and over the outfeed guides 32 to be refolded in a pack at the rear of the typewriter. A continuous sensing tape 30 is also mounted between the drum 12 and the roller 29 with the feed pins 13 on the drum engaging the apertures in the tape. This tape 30 is of such a length so as to rotate around the drum and roller once during the feeding of one form length of the continuously stationery web. Alternatively, the tape may rotate once corresponding to the feeding of 2, 3, 4 or more form lengths of continuous stationery web. The stationery is located at the desired halting position (for example at the position whereof the address of the person to whom the stationery is to be posted is located) and at this location an aperture is made in the tape at the position of the sensing pin. This is repeated for each of the desired halting positions on the form length.

When the holes are located in the required position in the tape the mechanism may be used to feed the continuous stationery web and the endless tape in synchronism. In this condition the manually operated handle will be pivoted to urge the sleeve 11 inwards, and the lever 19 is so located that the pin 20 will be urged towards the apertures 14 in the drum. Feeding will continue because the tape prevents the pin passing into the apertures in the drum. However, when an aperture passes beneath the sensing pin to permit the pin to move into the appropriate hole in the drum and because the pin is at right angles to the path of movement to the drum, the rotation of the drum will be halted. Hence the feeding of the continuous stationery web and the tape will be halted at the required typing position.

Typing will then take place and the web will be fed forwards by the usual web feeding mechanism on the typewriter. When the block of information has been printed by the typewriter, the manually operated lever will again be rotated and the stationery will be halted at the next stopping position and a further block of information typed on the web. This will be repeated several times on each form length and the process continued.

What I claim is:

1. An aperture sensing mechanism and stop device comprising, in combination, a stationary supporting frame; means for feeding an apertured tape; a sensing pin member and a feed stop member both disposed in proximity to said tape and disposed respectively upon opposite sides thereof; means supporting one of said members for movement with said tape and means for supporting the other of said members upon said supporting frame; means for yieldingly urging said sensing pin member toward said tape and in lateral registry with the aperture therein; at least a portion of said stop member also being disposed in lateral registry with said aperture on the opposite side of said tape, said sensing pin member when urged toward said tape resiliently bearing against the latter until an aperture is brought into longitudinal registry therewith, said sensing pin member passing through said aperture and contacting positively said stop member to cause it to halt the tape feeding means.

2. The aperture sensing mechanism and stop device as set forth in claim 1 wherein there are provided web feeding means for continuous stationery forms and means for operatively connecting said web feeding means with said tape feeding means for proportionate feeding movement, there being a series of sensing apertures in said tape, the spacing of said apertures being proportionate to the distances between similar corresponding imprinting starting areas on the respective forms on the web, whereby the stop member when abutted by said sensing pin member will halt the feeding of said form web at the desired area for each successive form thereon.

3. The aperture sensing mechanism and stop device as set forth in claim 1 in which said tape is trained around a drum fixed upon a drive shaft to rotate therewith, apertures are provided in said drum in registry with the apertures in said tape whereby said drum constitutes said stop member whose rotation is halted by the entry of said sensing pin member into the drum apertures after passing through said tape.

4. The aperture sensing mechanism and stop device as set forth in claim 3 in which a manually operated handle is adjustably carried by said shaft to rotate the latter and thereby the drum and the wound portions of the tape, operative connections are provided between said handle and the sensing pin member urging means, whereby adjustment of said handle will yieldingly urge the sensing pin member toward the tape.

5. The aperture sensing mechanism and stop device as set forth in claim 4 in which an axially movable sleeve is mounted on said shaft within said drum and disposed to be contacted and moved by said handle and to itself contact the yielding urging means to move the sensing pin member toward said tape.

6. The aperture sensing mechanism and stop device as set forth in claim 2 in which said tape is trained around a drum fixed upon a drive shaft to rotate therewith, apertures are provided in said drum in registry with the apertures in said tape whereby said drum constitutes said stop member whose rotation is halted by the entry of said sensing pin member into the drum apertures after passing through said tape, and in which a crank handle is carried by said shaft and said shaft constitutes part of the said web feeding means, whereby manipulation of said handle will actuate both the web feed and the tape feed.

7. The aperture sensing mechanism and stop device as set forth in claim 6 in which said handle is pivotally mounted on said shaft for swinging to and from shaft rotating position, and operative connections are provided between said handle and the sensing pin member urging means, whereby swinging the handle toward shaft rotating position will yieldingly urge the sensing pin member toward said tape.

References Cited by the Examiner

UNITED STATES PATENTS 2,684,746　7/54　Bakelaar et al. _____ 226—9

FOREIGN PATENTS 18,721　1909　Great Britain.

ROBERT B. REEVES, *Primary Examiner.*

ANDRES H. NIELSEN, SAMUEL F. COLEMAN,
*Examiners.*